United States Patent
Lim et al.

(10) Patent No.: US 9,642,197 B2
(45) Date of Patent: May 2, 2017

(54) CIRCUIT FOR COMPENSATING BIPOLAR JUNCTION TRANSISTOR BASE CURRENT AND LED DRIVING APPARATUS HAVING THE SAME

(71) Applicant: Magnachip Semiconductor, Ltd., Cheongju-si (KR)

(72) Inventors: Gyu Ho Lim, Cheongju-si (KR); Jun Sik Min, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 14/590,264

(22) Filed: Jan. 6, 2015

(65) Prior Publication Data
US 2015/0268690 A1 Sep. 24, 2015

(30) Foreign Application Priority Data
Mar. 19, 2014 (KR) .................. 10-2014-0032389

(51) Int. Cl.
*H05B 33/08* (2006.01)
*G05F 1/56* (2006.01)

(52) U.S. Cl.
CPC ......... *H05B 33/0812* (2013.01); *G05F 1/561* (2013.01); *Y02B 20/345* (2013.01)

(58) Field of Classification Search
CPC .. H05B 37/029; H05B 37/02; H05B 41/3925; H05B 41/391; H05B 41/2828; H05B 33/0803
USPC ....... 315/291, 294, 185 R, 309; 323/82, 268, 323/313
See application file for complete search history.

(56) References Cited

U.S. PATENT DOCUMENTS

| 5,241,283 A * | 8/1993 | Sutterlin | H03F 3/72 307/3 |
| 5,519,341 A * | 5/1996 | Corsi | H03K 17/0822 327/427 |
| 5,724,519 A * | 3/1998 | Kato | H03F 1/34 345/10 |
| 5,806,522 A * | 9/1998 | Katims | G06F 19/3481 600/554 |
| 2004/0189401 A1* | 9/2004 | Shioe | H03F 1/0205 330/311 |
| 2004/0251399 A1* | 12/2004 | Misek | G01J 1/44 250/214 R |

(Continued)

FOREIGN PATENT DOCUMENTS

KR  10-2013-0018065 A  2/2013

*Primary Examiner* — Douglas W Owens
*Assistant Examiner* — Syed M Kaiser
(74) *Attorney, Agent, or Firm* — NSIP Law (57) ABSTRACT

Disclosed is a circuit for compensating a bipolar junction transistor (BJT) base current that mirrors the BJT base current to induce a mirror current that is coupled to an emitter of the BJT to decrease an emitter current by a size of the mirror current. Also disclosed is a light-emitting diode (LED) driving apparatus including an LED array, a BJT series-coupled to the LED array, a measuring unit coupled to an emitter of the BJT to measure a current flowing into the LED array, a differential amplifier configured to differentially amplify a reference voltage and the measured current to supply a base current to a base of the BJT, and a BJT base current compensation circuit as disclosed to accurately control an LED current.

18 Claims, 4 Drawing Sheets

(56) References Cited

U.S. PATENT DOCUMENTS

| | | | |
|---|---|---|---|
| 2011/0007525 A1* | 1/2011 | Jacques | H02M 7/537 363/17 |
| 2011/0057723 A1* | 3/2011 | Miyake | H03H 7/21 327/552 |
| 2011/0193924 A1* | 8/2011 | Nagumo | B41J 2/45 347/118 |
| 2011/0199008 A1* | 8/2011 | Trattler | G05F 1/575 315/185 R |
| 2011/0261138 A1* | 10/2011 | Nagumo | G03G 15/326 347/247 |
| 2012/0092070 A1* | 4/2012 | Fukushima | H03F 1/309 330/255 |
| 2012/0161844 A1* | 6/2012 | Chee | H03F 1/0277 327/355 |
| 2013/0114016 A1 | 5/2013 | Lim et al. | |
| 2013/0162150 A1 | 6/2013 | Masuda | |

\* cited by examiner

CIRCUIT FOR COMPENSATING BIPOLAR JUNCTION TRANSISTOR BASE CURRENT AND LED DRIVING APPARATUS HAVING THE SAME

CROSS-REFERENCE TO RELATED APPLICATIONS

This application claims the benefit under 35 USC 119(a) of Korean Patent Application No. 10-2014-0032389 filed on Mar. 19, 2014, in the Korean Intellectual Property Office, the entire disclosure of which is incorporated herein by reference for all purposes.

BACKGROUND

1. Field

The following description relates to a circuit for compensating a bipolar junction transistor (BJT) base current. The following description also relates to a circuit for compensating a BJT base current, capable of decreasing a current flowed to a measuring resistor by a value between a BJT emitter current and the BJT base current, to cause a light-emitting diode (LED) driving apparatus to control a BJT constant current without an error.

2. Description of Related Art

An LED has characteristics that a driving current and a brightness of the LED may change according to a change of a forwarded voltage. However, a brightness change of the LED according to a voltage change may degrade a lighting quality when the LED is used as a lighting device.

An LED driving apparatus may constantly control a current flowing into the LED to decrease the brightness change of the LED.

Figure 1:
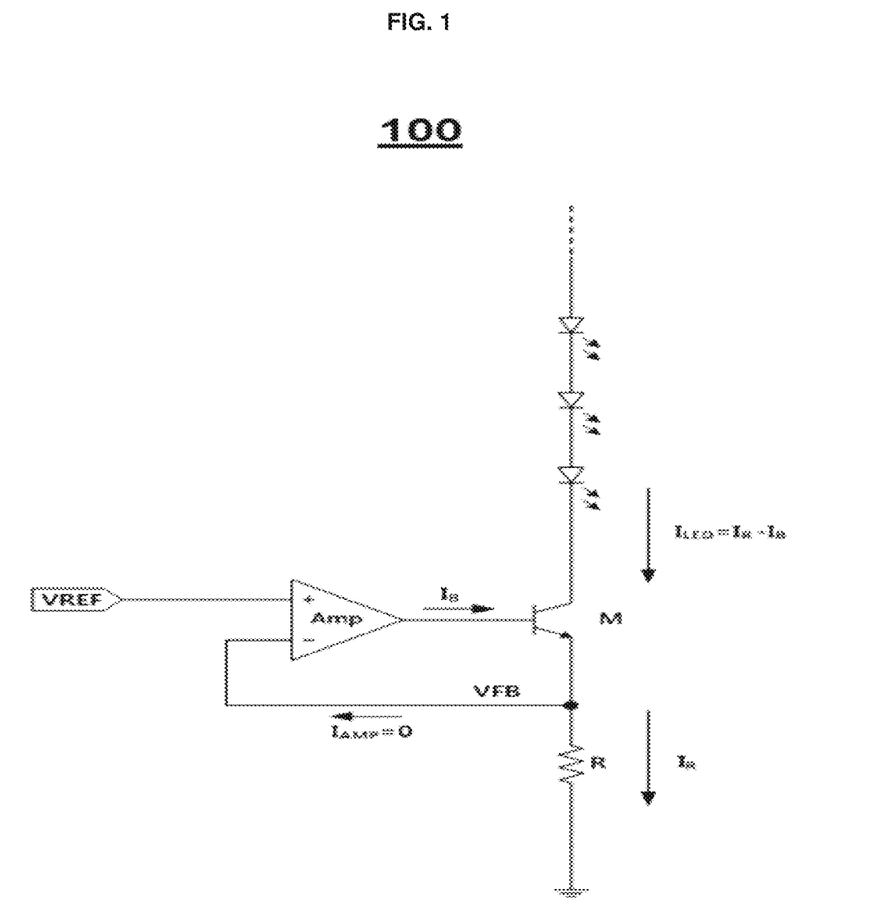
FIG. 1 is a circuit diagram illustrating an LED driving apparatus.

FIG. 1 is a circuit diagram illustrating an LED driving apparatus 100.

Referring to FIG. 1, an LED driving apparatus 100 controls an LED current by using a BJT switch.

Further, in this example, the LED driving apparatus 100 measures a voltage VFB of the BJT emitter terminal and the LED current ILED to control the BJT based on the measured voltage VFB and the LED current ILED.

A current $I_R$ flowed to a resistor R may be represented as the LED current $I_{LED}$ according to mathematical equations 1 and 2 when the BJT has a common current gain β.

$$I_B = \frac{I_C}{\beta} = \frac{I_{LED}}{\beta} \qquad \text{Mathematical Equation 1}$$

In Mathematical Equation 1, the common current gain β corresponds to any value from 50 to 200 according to an example and an $I_C$ corresponds to a current flowing into a BJT collector.

$$I_R = I_{LED} + I_B = I_{LED} + \frac{I_{LED}}{\beta} = I_{LED} * \left(1 + \frac{1}{\beta}\right) \qquad \text{Mathematical Equation 2}$$

In Mathematical Equation 2, an $I_B$ corresponds to a current flowing into a BJT base.

For example, the common current gain β may be assumed to be 100. Although the example LED driving circuit is designed to maintain the LED current $I_{LED}$ as 100 mA, an actual LED current corresponds to 99 mA according to a following Mathematical Equation 3.

$$I_{LED} = \frac{I_R}{1 + \frac{1}{\beta}} = \frac{100 \text{ mA}}{1.01} = 99 \text{ mA} \qquad \text{Mathematical Equation 3}$$

That is, when a current $I_R$ flowing into a measuring resistor is set to control the LED current $I_{LED}$, the conventional LED driving apparatus 100 has a problem that an error occurs having a ratio of "1+(1/β)". In certain examples, such an error occurs as above on an actual LED current. In other examples, the current is controlled using a metal-oxide-semiconductor field-effect transistor (MOSFET) in lieu of a BJT. In such examples, an actual LED current is substantially the same, such that $I_{drain} = I_{source}$, but a cost of the MOSFET is more expensive than that of the BJT.

Certain other approaches either fail to manage the actual LED current as desired and/or require the use of a MOSFET.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a BJT base current compensation technology capable of accurately controlling LED current in the contexts discussed above by using a BJT.

In one general aspect, a circuit compensates for a bipolar junction transistor (BJT) base current, wherein the circuit is configured to mirror the BJT base current to induce a mirror current and the circuit is coupled to an emitter of the BJT to decrease an emitter current by a size of the mirror current.

The circuit may include a mirror element configured to mirror the base current to induce the mirror current, and an inflow element configured to flow a current received from the outside into the circuit having a same size as a size of the induced mirror current.

The mirror element may be a second p-type metal-oxide-semiconductor (PMOS) transistor, wherein an amplifier supplies the base current to the BJT by using a first PMOS transistor and wherein a gate of the second PMOS transistor is coupled to a gate of the first PMOS transistor.

The inflow element may include first and second n-type metal-oxide-semiconductor (NMOS) transistors, the first NMOS transistor including a drain and a gate both coupled to a drain of the mirror element and the second NMOS transistor including a gate coupled to the drain of the mirror element and a drain coupled to an emitter of the BJT.

In another general aspect, a light-emitting diode (LED) driving apparatus includes an LED array, a bipolar junction transistor (BJT) series-coupled to the LED array, a measuring unit coupled to an emitter of the BJT to measure a current flowing into the LED array, a differential amplifier configured to differentially amplify a reference voltage and the measured current to supply a base current to a base of the BJT, and a BJT base current compensation circuit configured to mirror the base current to induce a mirror current and configured to be coupled to the emitter of the BJT to decrease a size of a current flowing into the measuring unit by that of the mirror current.

The measuring unit may be a resistor.

The BJT base current compensation circuit may include a mirror element configured to mirror the base current to induce the mirror current, and an inflow element configured to flow a current received from the outside into the circuit having a same size as a size of the induced mirror current.

The mirror element may be a second p-type metal-oxide-semiconductor (PMOS) transistor, wherein the differential amplifier supplies the base current to the BJT by using a first PMOS transistor and wherein a gate of the second PMOS transistor is coupled to a gate of the first PMOS transistor.

The inflow element may include first and second n-type metal-oxide-semiconductor (NMOS) transistors, the first NMOS transistor including a drain and a gate both coupled to a drain of the mirror element and the second NMOS transistor including a gate coupled to the drain of the mirror element and a drain coupled to the emitter of the BJT.

A non-inverting input terminal of the differential amplifier may receive the reference voltage and an inverting input terminal of the differential amplifier may be coupled to the emitter of the BJT and the BJT base current compensation circuit.

A current flowing into the LED array may be of substantially the same size as a current flowing into the measuring unit.

In another general aspect, a circuit for compensating a bipolar junction transistor (BJT) base current includes a mirror element configured to mirror the base current to induce a mirror current, and an inflow element configured to flow a current received from the outside into the circuit having a same size as a size of the induced mirror current, wherein the circuit is coupled to an emitter of the BJT to decrease an emitter current by a size of the mirror current.

The mirror element may be a second p-type metal-oxide-semiconductor (PMOS) transistor, wherein an amplifier supplies the base current to the BJT by using a first PMOS transistor and wherein a gate of the second PMOS transistor is coupled to a gate of the first PMOS transistor.

The inflow element may include first and second n-type metal-oxide-semiconductor (NMOS) transistors, the first NMOS transistor including a drain and a gate both coupled to a drain of the mirror element and the second NMOS transistor including a gate coupled to the drain of the mirror element and a drain coupled to an emitter of the BJT.

The BJT base current compensation technology according to an example removes a base current from a BJT emitter current to flow into the measuring resistor. Therefore, the BJT base current compensation technology may accurately control an LED current.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms described and used in the present disclosure are to be understood as follows.

While terms such as "first" and "second," etc., may be used to describe various components, such components are not to be understood as being limited to the above terms. The above terms are used only to distinguish one component from another. For example, a first component may be referred to as a second component without departing from the scope of rights of the present disclosure, and likewise a second component may be referred to as a first component.

It is to be understood that when an element is referred to as being "coupled to" another element, it is potentially directly coupled to the other element or alternatively, intervening elements may also be present. In contrast, when an element is referred to as being "directly coupled to" another element, no intervening elements are present. Also, unless explicitly described to the contrary, the word "comprise" and variations such as "comprises" or "comprising," are to be understood to imply the inclusion of stated elements but not the exclusion of any other elements. Meanwhile, other expressions describing relationships between components such as "~ between", "immediately ~ between" or "adjacent to ~" and "directly adjacent to ~" are to be construed similarly, in that they imply that the relationship is present, but they do not exclude other relationships unless explicitly recited.

Singular forms "a", "an" and "the" in the present disclosure are intended to include the plural forms as well, unless the context clearly indicates otherwise. It is to be further understood that terms such as "including" or "having," etc., are used to indicate the existence of the features, numbers, operations, actions, components, parts, or combinations thereof disclosed in the specification, and are not used to preclude the possibility that one or more other features, numbers, operations, actions, components, parts, or combinations thereof potentially exist or are potentially added.

The terms used in the present application are merely used to describe various examples, and are not used to limit the present disclosure. Unless otherwise defined, all terms used herein, including technical or scientific terms, are used to have substantially the same meanings as those generally understood by those with ordinary knowledge in the field of art to which the present disclosure belongs in view of the present disclosure. Such terms as those defined in a generally used dictionary are to be interpreted to have the meanings that are the same as the contextual meanings in the relevant field of art, and are not to be interpreted to have ideal or excessively formal meanings unless clearly defined as such in the present disclosure.

Figure 2:
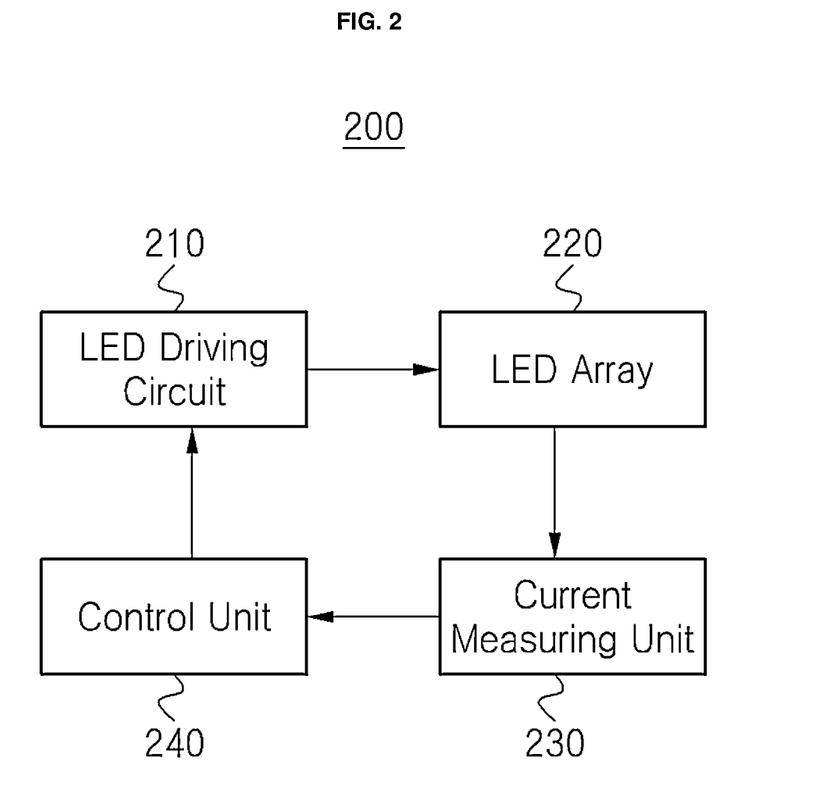
FIG. 2 is a block diagram illustrating an LED driving apparatus according to an example.

FIG. 2 is a block diagram illustrating an LED driving apparatus according to an example.

Referring to FIG. 2, an LED driving apparatus 200 includes an LED driving circuit 210, an LED array 220, a current measuring unit 230 and a control unit 240. In examples, the LED driving apparatus 200 corresponds to a lighting apparatus or a video display apparatus, such as a monitor.

In the example of FIG. 2, the LED driving circuit 210 receives a dimming signal for driving an LED array and provides a driving voltage and a constant current to the LED array 220 according to the dimming signal that it receives. Herein, the dimming signal corresponds to a signal for adjusting a LED brightness and a color temperature and/or compensating such a temperature.

A dimming method generally includes a direct mode, a fixed phase mode and a phase shift mode. Accordingly, the direct mode controls all of the Pulse Width Modulation (PWM) frequencies and on-duty signals on the outside. The fixed phase mode and the phase shift mode internally generate the PWM frequency and receive the on-duty signal from the outside.

Also, in an example, the LED driving circuit 210 adjusts a size of the driving current in the LED array 220 by using the dimming signal to provide the adjusted constant current, that is, the driving current, to the LED array 220.

In examples, the LED array 220 is implemented as a plurality of LEDs performing a light emitting operation, such that a plurality of the LEDs is series-coupled or parallel-coupled. The LED driving apparatus 200 includes at least one LED array 220.

The current measuring unit 230 measures a current flowing into the LED array 220. Accordingly, in an example, the current measuring unit 230 includes a measuring resistor series-coupled to the LED array 220 that measures the current, that is, LED current, flowing into the LED array based on a voltage received at both sides of the measuring resistor.

The control unit 240 controls each element in the LED driving apparatus. Accordingly, the control unit 240 generates the dimming signal for driving the LED array 220 to provide the generated dimming signal to the LED driving circuit 210. Also, in examples, the control unit 240 forms or cuts off a LED current movement path based on the LED current measured in the current measuring unit 230, to control a size of the LED current.

Figure 3:
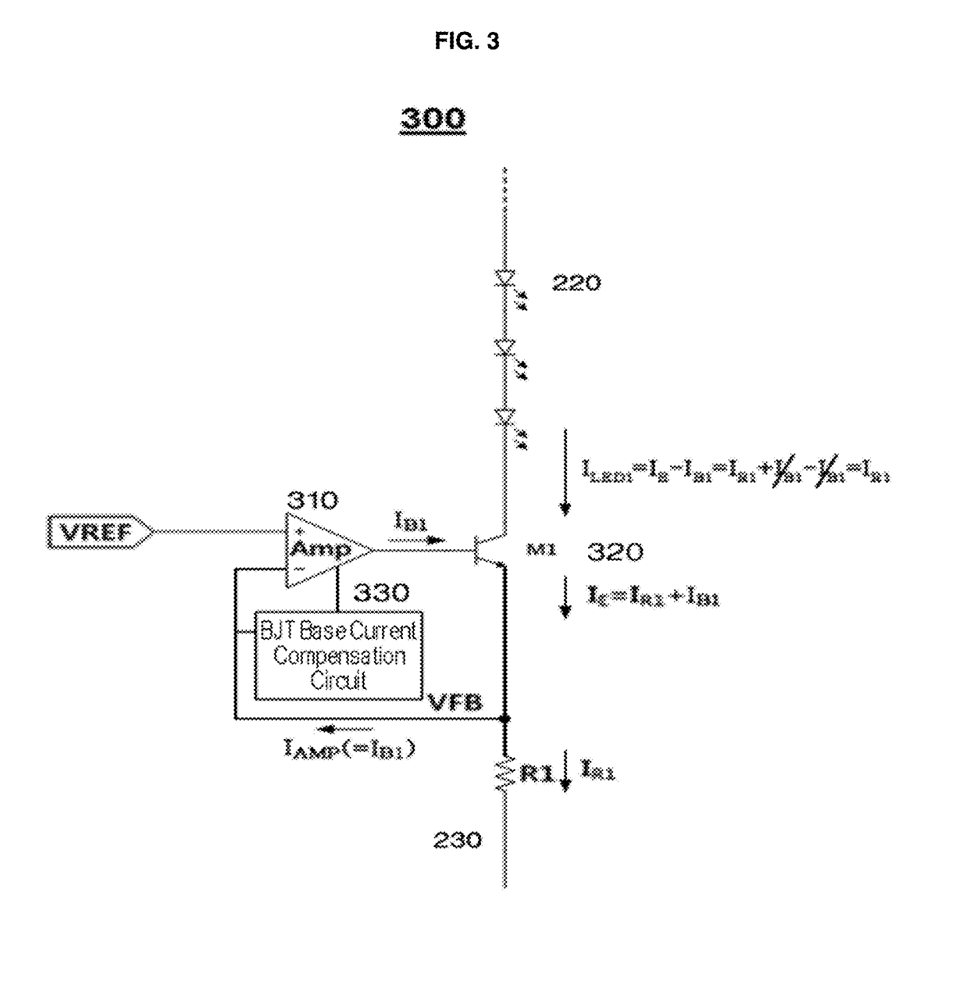
FIG. 3 is a circuit diagram illustrating an example of an LED driving apparatus according to the example of FIG. 2.

FIG. 3 is a circuit diagram illustrating an example of an LED driving apparatus according to the example of FIG. 2.

The circuit diagram of a LED driving apparatus 300 as illustrated in FIG. 3 is just used as an illustrative example. However, the examples are not to be limited by features of this circuit diagram.

Referring to FIG. 3, the LED array 220 includes three series-coupled LEDs that are series-coupled with each other.

The current measuring unit 230 includes a measuring resistor R1 that is series-coupled to the LED array 220. The control unit 240 measures the LED current based on a voltage at both sides of the measuring resistor R1. That is, the control unit measures a voltage VFB of a node coupled to the measuring resistor R1 and the LED array 220. Thus, a magnitude of the measuring resistor R1 is varied according to examples of product applications.

For example, when the resistance of measuring resistor R1 corresponds to about 100Ω and the value of the LED current corresponds to about 100 mA, the voltage of the node corresponds to about 10V.

The control unit 240 receives a reference voltage VREF and a measured voltage to generate a control signal $I_{B1}$. In the example of FIG. 2, the control unit 240 forms or cuts off a current movement path of the LED array 220 based on the generated control signal $I_{B1}$ to control a size of the LED current. In this example, the reference voltage VREF corresponds to a value predefined according to characteristics of a BJT 320 and a specified LED current.

In this example, the control unit 240 includes a differential amplifier 310, which may alternatively be an operational amplifier, the BJT 320 and a BJT base current compensation circuit 330.

As illustrated in FIG. 3, a non-inverting input terminal (+) of the differential amplifier 310 receives the reference voltage VREF and a inverting input terminal (−) of the differential amplifier 310 receives a measured voltage VFB. In this example, the differential amplifier 310 amplifies a difference between the reference voltage VREF and the measured voltage VFB to generate the control signal $I_{B1}$ controlling the BJT 320. In such an example, the reference voltage VREF corresponds to a voltage predefined for controlling the LED. For example, when the measuring resistor R1 corresponds to about 100Ω and the LED current corresponds to about 100 mA, the reference voltage corresponds to about 10 V.

In the example of FIG. 3, the BJT base current compensation circuit 330 coupled to the inverting terminal of the differential amplifier 310 receives an input current. Here, a size of the input current of the BJT base current compensation circuit 330 is substantially the same as that of an output current, such as the control signal, $I_{B1}$, of the differential amplifier 310.

According to theory, an input terminal resistance of an ideal differential amplifier 310 has an infinite value and the input terminal of the ideal differential amplifier 310 does not receive a current. That is, a same current as the output current, that is, the control signal, of the differential amplifier 310 flows into the BJT base current compensation circuit 330 according to an example. In such an example, a BJT emitter current increases based on the inflow current.

The BJT 320 forms the current movement path of the LED array 220 based on the control signal $I_{B1}$. Accordingly, the BJT 320 has a common current gain β and the BJT 320 forms the current movement path. The current flows into the LED array 220 along the current movement path as a value ($I_{B1}*β$) that is the product of the BJT base current $I_{B1}$ and the common current gain β. In this example, the current flows into the LED array 220 in proportion to the base current $I_{B1}$ when the common current gain β is constant.

Further, FIG. 3 is described with respect to a current flow in the LED driving apparatus 200.

In the example of FIG. 3, the LED driving apparatus 200 controls an LED current $I_{LED1}$ based on a current $I_{R1}$ measured in the measuring resistor R1, as discussed above. Therefore, in this example, the measured current $I_{R1}$ in the current measuring unit 230 and a control signal $I_B$ generated according to the measured current $I_{R1}$ are assumed to be provided or set for use by the LED driving apparatus 200.

A size of the current $I_{B1}$ flowing from a node coupled to the BJT 320 and the measuring resistor R1 to the control unit 240 is substantially same as that of the control signal $I_{B1}$. Therefore, a value of a BJT emitter current $I_E$, that is, that of a current flowing into the current measuring unit 230 through the BJT 320 is has substantially the same value as a sum of a current value IR1 flowing into the measuring resistor R1 and a control signal value IB1. Thus, $I_E=I_{R1}+I_{B1}$.

Also, a value of the BJT emitter current $I_E$ is a substantially the same value as a sum of a base current value $I_{B1}$ and a collector current value $I_C$, according to Mathematical Equation 1 presented above, $I_E=I_{B1}+I_C$. In this example, the BJT collector current $I_C$ corresponds to the LED current $I_{LED1}$. Therefore, the LED current $I_{LED1}$ corresponds to a difference between the emitter current $I_E$ and the base current $I_{B1}$, satisfying $I_{LED1}=I_E-I_{B1}$. As a result, the LED current $I_{LED1}$ is substantially the same value as the current flowing into the measuring resistor R1. Thus, $I_{LED1}=I_{R1}$.

Therefore, the LED driving apparatus measure a substantially same current value as the LED current $I_{LED1}$ measured the measuring resistor R1 to accurately control the LED current $I_{LED1}$ without an error based on adjustments using the measurement.

Figure 4:
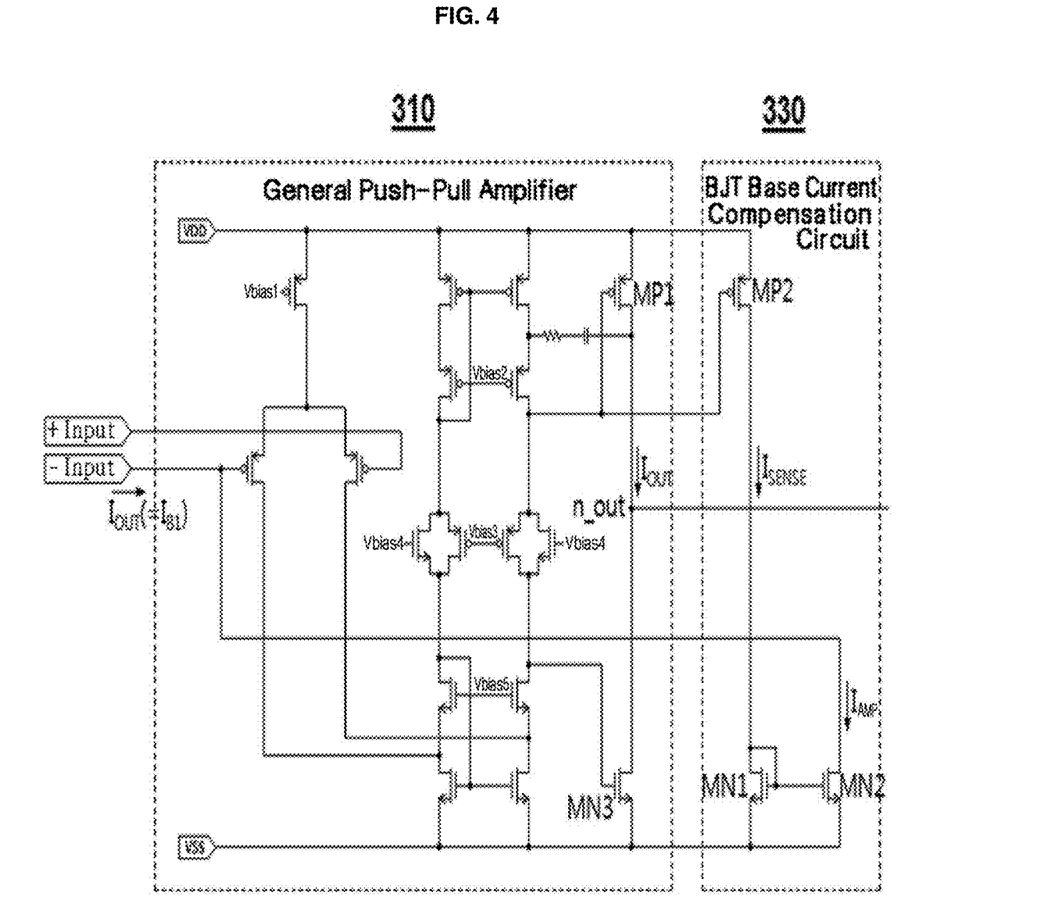
FIG. 4 is a circuit diagram illustrating an example of a BJT based current compensation circuit according to the example of FIG. 2.

FIG. 4 is a circuit diagram illustrating an example of a BJT base current compensation circuit according to the example of FIG. 2.

Referring to the example of FIG. 4, the BJT base current compensation circuit 330 mirrors an output current $I_{out}$ of the differential amplifier 310 so as to induce a mirror current $I_{SENSE}$. The BJT base current compensation circuit 330 is coupled to the input terminal of the differential amplifier 310, so as to force to flow a current $I_{AMP}$ of substantially the same size as that of the mirror current $I_{SENSE}$.

Accordingly, in the example of FIG. 4, the differential amplifier 310 is implemented as a general push-pull amplifier. A pair of the input signals, the reference voltage and the measured current, is inputted in the input terminals +,- to be amplified. In this example, the differential amplifier 310 drives an output load, not illustrated, coupled to an output node n_out according to the amplified signal and a bias voltage $V_{bias1}$. In such an example, the output load corresponds to the BJT 320 and the output load is coupled to the BJT base.

The differential amplifier 310 includes a pair of PMOS transistors, another PMOS transistor, and a plurality of PMOS transistors and NMOS transistors. In the differential amplifier 310, a gate of each of the pair of the PMOS transistors receives a pair of input signals, a gate of the PMOS transistor receives a constant bias voltage $V_{bias1}$ and the plurality of the PMOS transistors and the NMOS transistors together form an active load.

Accordingly, the differential amplifier 310 includes a first PMOS transistor MP1 for a current source and a NMOS transistor MN3 for a current sink. The first PMOS transistor MP1 is coupled to the output node n_out to charge the output load, and the NMOS transistor MN3 discharges the output load.

First and second reference voltages VDD, VSS correspond to a power supply driving the differential amplifier 310. Thus, an operating range of the differential amplifier 310 corresponds to voltages that are between VSS through VDD.

In this example, the BJT base current compensation circuit 330 mirrors a current of the first PMOS transistor MP1 to induce the mirror current $I_{SENSE}$ into a second PMOS transistor MP2. Also, a current flows according to a size of the mirror current through the path of the BJT base current compensation circuit 330 coupled to the BJT emitter and the inverting input terminal of the amplifier. Also, potentially the BJT base current compensation circuit 330 decreases a current in the measuring resistor.

Accordingly, the BJT base current compensation circuit 330 includes the second PMOS transistor MP2 and first and second NMOS transistors MN1 and MN2. The second PMOS transistor MP2 receives a signal that is substantially same as a signal of the first PMOS transistor MP1 in the differential amplifier 310 and mirrors an output signal to output the mirror current $I_{SENSE}$. A drain and a gate of the first NMOS transistor MN1 are coupled to a drain of the PMOS transistor and the mirror current $I_{SENSE}$ flows into the first NMOS transistor NM1. A gate of the second NMOS transistor NM2 is coupled to that of the first NMOS transistor and a current $I_{AMP}$ that is of a substantially same size as that of the mirror current $I_{SENSE}$ flows into the second NMOS transistor NM2.

Thus, the second PMOS transistor MP2 mirroring the output signal to output the mirror current $I_{SENSE}$ acts as a mirror element. Also, the first and second NMOS transistors MN1, MN2 act as inflow elements. The mirror current $I_{SENSE}$ flows into the first NMOS transistor MN1, and a current $I_{AMP}$ of a substantially same size as that of the mirror current $I_{SENSE}$ flows into the second NMOS transistor.

A drain of the second NMOS transistor MN2 is coupled to the BJT emitter through a path coupled to the inverting input terminal of the differential amplifier 310 and the second NMOS transistor MN2 forces to flow a current $I_{AMP}$ that is of substantially the same size as that of the mirror current $I_{SENSE}$ flowing through the path.

Also, as illustrated in FIG. 3, the inverting terminal of the differential amplifier 310 is coupled to the BJT emitter and the compensation circuit, so a part of the emitter current, that is, $I_{SENSE}$, flows into the BJT base current compensation circuit 330.

As a result, a current $I_{AMP}$ of substantially the same size as the mirror current of the BJT emitter current with respect to the output signal, that is, the BJT base current $I_{B1}$, of the differential amplifier 310 flows into the compensation circuit that is coupled to the inverting input terminal of the differential amplifier 310 and the inflow current flows into the second NMOS transistor MN2 of BJT base current compensation circuit 330. Therefore, as illustrated in FIG. 3, the base current $I_{B1}$ is removed from the BJT emitter current $I_E$ and the current $I_{R1}$ flowing into the measuring resistor is substantially the same as the LED current $I_{LED1}$. That is, these values satisfy "$I_{R1}=I_E-I_{B1}=I_{LED1}$".

Therefore, in examples, a size of the current flowing into the measuring resistor is of substantially the same size as that of a BJT emitter current that removes the base current. The BJT base current compensation circuit 330, according to an example accurately measures the LED current of the LED driving apparatus, and also accurately controls the LED current based on the accurately measured LED current.

Also, a production unit cost and a purchase unit cost of the LED driving apparatus accordingly decrease because the price of using BJT elements is lower than the price of using MOSFET elements and the BJT is capable of controlling the LED with a constant current.

Unless indicated otherwise, a statement that a first layer is "on" a second layer or a substrate is to be interpreted as covering both a case where the first layer is directly contacts the second layer or the substrate, and a case where one or more other layers are disposed between the first layer and the second layer or the substrate.

The spatially-relative expressions such as "below", "beneath", "lower", "above", "upper", and the like may be used to conveniently describe relationships of one device or elements with other devices or among elements. The spatially-relative expressions should be understood as encompassing the direction illustrated in the drawings, added with other directions of the device in use or operation. Further, the device may be oriented to other directions and accordingly, the interpretation of the spatially-relative expressions is based on the orientation.

The expression such as "first conductivity type" and "second conductivity type" as used herein may refer to the conductivity types such as N or P types which are opposed to each other, and an example explained and exemplified herein encompasses complementary examples thereof.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A circuit for compensating a bipolar junction transistor (BJT) base current, the circuit comprising:
    a mirror element configured to mirror the BJT base current; and
    an amplifier comprising a first p-type metal-oxide-semiconductor (PMOS) transistor being directly connected to a base of the BJT, the first PMOS transistor being directly coupled to the mirror element to induce a mirror current into the mirror element,
    wherein the mirror element is a second PMOS transistor.

2. The circuit of claim 1, wherein the circuit further comprises
    an inflow element configured to flow a current received from the outside into the circuit having a same size as a size of the induced mirror current.

3. The circuit of claim 2, wherein the amplifier supplies the base current to the BJT by using the first PMOS transistor and wherein a gate of the second PMOS transistor is coupled to a gate of the first PMOS transistor.

4. The circuit of claim 3, wherein the inflow element comprises first and second n-type metal-oxide-semiconductor (NMOS) transistors, the first NMOS transistor comprising a drain and a gate both coupled to a drain of the mirror element and the second NMOS transistor comprising a gate coupled to the drain of the mirror element and a drain coupled to the emitter of the BJT.

5. The circuit of claim 1, wherein the amplifier is push-pull amplifier.

6. A light-emitting diode (LED) driving apparatus comprising:
an LED array;
a bipolar junction transistor (BJT) series-coupled to the LED array;
a measuring unit coupled to an emitter of the BJT to measure a current flowing into the LED array;
a differential amplifier comprising a first p-type metal-oxide-semiconductor (PMOS) transistor, the differential amplifier configured to differentially amplify a reference voltage and the measured current to supply a base current to a base of the BJT through the first PMOS transistor being directly connected to the base of the BJT; and
a BJT base current compensation circuit comprising a mirror element defining a second PMOS transistor being configured to mirror the BJT base current, the first PMOS transistor being directly coupled to the second PMOS transistor to induce a mirror current into the second PMOS, and configured to be coupled to the emitter of the BJT to decrease a size of a current flowing into the measuring unit by that of the mirror current.

7. The LED driving apparatus of claim 6, wherein the measuring unit is a resistor.

8. The LED driving apparatus of claim 6, wherein the BJT base current compensation circuit comprises:
an inflow element configured to flow a current received from the outside into the circuit having a same size as a size of the induced mirror current.

9. The LED driving apparatus of claim 8, wherein a gate of the second PMOS transistor is coupled to a gate of the first PMOS transistor.

10. The LED driving apparatus of claim 9, wherein the inflow element comprises first and second n-type metal-oxide-semiconductor (NMOS) transistors, the first NMOS transistor comprising a drain and a gate both coupled to a drain of the mirror element and the second NMOS transistor comprising a gate coupled to the drain of the mirror element and a drain coupled to the emitter of the BJT.

11. The LED driving apparatus of claim 6, wherein a non-inverting input terminal of the differential amplifier receives the reference voltage and wherein an inverting input terminal of the differential amplifier is coupled to the emitter of the BJT and the BJT base current compensation circuit.

12. The LED driving apparatus of claim 6, wherein a current flowing into the LED array is of substantially the same size as a current flowing into the measuring unit.

13. A circuit for compensating a bipolar junction transistor (BJT) base current, comprising:
an amplifier comprising a first p-type metal-oxide-semiconductor (PMOS) transistor;
a mirror element defining a second PMOS transistor being configured to mirror the base current, the first PMOS transistor being directly coupled to the second PMOS transistor to induce a mirror current into the second PMOS transistor; and
an inflow element configured to flow a current received from the outside into the circuit having a same size as a size of the induced mirror current and the inflow element comprising a first n-type metal-oxide-semiconductor (NMOS) transistor directly coupled to the mirror element,
wherein the circuit is coupled to an emitter of the BJT to decrease an emitter current by a size of the mirror current.

14. The circuit of claim 13, wherein the amplifier supplies the base current to the BJT by using the first PMOS transistor, and a gate of the second PMOS transistor is coupled to a gate of the first PMOS transistor.

15. The circuit of claim 14, wherein the inflow element further comprises a second n-type metal-oxide-semiconductor (NMOS) transistors, the first NMOS transistor comprising a drain and a gate both coupled to a drain of the mirror element and the second NMOS transistor comprising a gate coupled to the drain of the mirror element and a drain coupled to an emitter of the BJT.

16. The circuit of claim 13, wherein the amplifier is push-pull amplifier.

17. A circuit for compensating a bipolar junction transistor (BJT) base current, the circuit comprising:
a mirror element configured to mirror the BJT base current,
wherein a push-pull amplifier comprising a first p-type metal-oxide-semiconductor (PMOS) transistor is being directly coupled to the mirror element defining a second PMOS transistor to induce a mirror current into the second PMOS transistor, and
wherein the first PMOS transistor is directly connected to a base of the BJT.

18. The circuit of claim 17, wherein the measuring unit is a resistor.

* * * * *